(12) United States Patent
Pascarella et al.

(10) Patent No.: US 8,224,471 B2
(45) Date of Patent: Jul. 17, 2012

(54) ALLOCATION OF MULTIPLE PRODUCT STRUCTURES

(75) Inventors: Nicholas Pascarella, Cypress, CA (US); Krishna Nadimetla, Cypress, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 971 days.

(21) Appl. No.: 11/535,445

(22) Filed: Sep. 26, 2006

(65) Prior Publication Data
US 2007/0106486 A1 May 10, 2007

Related U.S. Application Data

(60) Provisional application No. 60/720,780, filed on Sep. 27, 2005.

(51) Int. Cl.
*G06F 19/00* (2011.01)
(52) U.S. Cl. ........................................... 700/97
(58) Field of Classification Search .................. 700/95, 700/97, 103, 105, 107, 115, 99; 703/6; 705/7.11, 705/7.25, 7.31, 7.36, 7.37, 22
See application file for complete search history.

(56) References Cited

U.S. PATENT DOCUMENTS

| | | | |
|---|---|---|---|
| 4,847,761 A * | 7/1989 | Ferriter et al. | 705/29 |
| 5,119,307 A * | 6/1992 | Blaha et al. | 700/107 |
| 6,002,854 A | 12/1999 | Lynch et al. | |
| 6,885,902 B2 * | 4/2005 | Crampton et al. | 700/99 |
| 7,085,776 B2 * | 8/2006 | Callahan | 707/104.1 |
| 2003/0220852 A1 * | 11/2003 | Back et al. | 705/29 |
| 2006/0161544 A1 * | 7/2006 | Lee et al. | 707/6 |
| 2009/0070368 A1 * | 3/2009 | Callahan | 707/102 |

OTHER PUBLICATIONS

Salecker et al; "Bill of Material"; Mar. 14, 2005; pp. 1-9.*
Schmid et al. "Domain Mapping for Product Line Requirements"; 2004; pp. 1-8.*
Singh et al. "A System for Automated Mapping of Bill-of Materials Par Numbers"; 2004; pp. 805-810.*
Wongvasu et al.;"Represetning the relationship between items in logical bill of material to support customers' request for quotation for make-to-order products";2000; SPIE; vol. 4192; pp. 74-85.*
Jiao et al.; "Product Family Modeling for Mass Customization"; 1998; Elsevie; vol. 35 Nos. 3-4 pp. 495-498.*
Shah et al; "2nd-CAD: A Toll for Conceptual Systems Design in Electromechanical Domain"; Mar. 2004; vol. 4; issue 1; pp. 1-3.*
Xiao-chuan et al. "Application of mutiple domain feature mapping in Desgin for Cost(DFC)"; Jul. 2002; pp. 1-8.*
Braha, Dan; Partioning Tasks to Product Development Teams; Oct. 2, 2002; Proceedings of DETC'02 ASME 2002 Internaional Design Engineering Technical Conferences; pp. 1-12.*
Blomberg et al.; "Mapping of Raltions and Dependencies using DSM/DMM-analysis"; Jun. 6, 2005; pp. 1-35.*
Dahlquist et al.; "Product Data Managemnet and Software Configuration Management"; Sep. 27, 2001; pp. 1-181.*
Schmid, Kendra; "Domain Mapping for Product-line Requirements"; Nov. 5, 2004; Technical Report, Computer Sceince, Iowa State Univrsity; pp. 1-9.*

* cited by examiner

*Primary Examiner* — Albert Decady
*Assistant Examiner* — Chad Rapp

(57) ABSTRACT

A system, method, and computer program for allocating product structures, comprising the steps of representing a product with at least one product structure; mapping a domain relationship from said at least one product structure; and deriving a fulfilled product structure through said mapping and appropriate means and computer-readable instructions.

17 Claims, 6 Drawing Sheets

ALLOCATION OF MULTIPLE PRODUCT STRUCTURES

PRIORITY APPLICATION

The present application claims priority of U.S. provisional application Ser. No. 60/720,780 filed Sep. 27, 2005, which is incorporated herein by reference.

TECHNICAL FIELD

The presently preferred embodiment of the innovations described herein relate generally to product design. More specifically, the presently preferred embodiment relates to allocating multiple product structures.

BACKGROUND

Hierarchical product structures consisting of various product constituents such as assembly components are typically used to model the product content in product life cycle management (PLM) products. These product structures can be revised as the product design matures and changes over the life cycle of the product and can be configured for various product configurations. Each of these product structures captures a particular aspect of the product and is commonly referred to as a product structure.

A product is often represented using more than one product structure in cases where multiple representations are desirable. For example, electro-mechanical products are modeled using multiple product structures, e.g., using functional models, logical models and one or more physical models. Similarly, when a product design involves systems engineering methodology, a separate product structure is created to manage each aspect of system design such as requirements, functional behavior and physical model. Other models may be created to model various aspects of the product, such as electrical models, connectivity models, etc. When a product is modeled using multiple product structures as outlined above, one of the challenges is to correctly model and track changes to these components and the impact of those changes across the various structures.

What is needed is a method of modeling relationships between the elements of the multiple product structures such that the traceability between the elements can be determined for various product configurations and revisions.

SUMMARY

To achieve the foregoing, and in accordance with the purpose of the presently preferred embodiment as broadly described herein, the present application provides a method allocating product structures, comprising the steps of: representing a product with at least one product structure; mapping a domain relationship from said at least one product structure; and deriving a fulfilled product structure through said mapping. The method wherein said product structure is a bill of material. The method, wherein said bill of material is to one of a functional model, a physical model, and a logical model. The method, wherein said domain relationship is one of a fulfillment, an implemented-by, and a realization of. The method, wherein said domain relationship is a fulfillment from a first product structure to at least one more product structure. The method, wherein said domain relationship is a first product structure implemented by at least one other product structure. The method, wherein said domain relationship is a first product structure that provides the realization of at least on other product structure. The method, wherein said domain relationship is conditional based upon a defined rule set. The method, wherein a revision history is maintained for said mapping step.

Another advantage of the presently preferred embodiment is to provide a method for allocating multiple product structures, comprising the steps of allocating a component in a first product structure based on a rule set, wherein said allocation is to an absolute occurrence of said component; and tracking a plurality of revisions of said allocation for recall. The method, wherein said allocating step is to an absolute occurrence.

And another advantage of the presently preferred embodiment is to provide a method for allocating multiple product structures, comprising the steps of connecting an allocation to at least one source component having a source BOM view, with a plurality of target components each having a target BOM view; connecting a structure map to said source BOM view with said target BOM view; and relating at least one domain relationship from said source BOM view to said target BOM view. The method, further comprising the step of revising said components independently from said allocation.

And still another advantage of the presently preferred embodiment is to provide a computer-program product tangibly embodied in a machine readable medium to perform a method, comprising instructions for representing a product with at least one product structure; instructions for mapping a domain relationship from said at least one product structure; and instructions for deriving a fulfilled product structure through said mapping. The computer-program product, wherein said product structure is a bill of material. The computer-program product, wherein said bill of material is to one of a functional model, a physical model, and a logical model. The computer-program product, wherein said domain relationship is one of a fulfillment, an implemented-by, and a realization of. The computer-program product, wherein said domain relationship is a fulfillment from a first product structure to at least one more product structure. The computer-program product, wherein said domain relationship is a first product structure implemented by at least one other product structure. The computer-program product, wherein said domain relationship is a first product structure that provides the realization of at least one other product structure. The computer-program product, wherein said domain relationship is conditional based upon a defined rule set. The computer-program product, wherein a revision history is maintained for said mapping step.

And yet another advantage of the presently preferred embodiment is to provide a data processing system having at least a processor and accessible memory to implement a method for allocating product structures, comprising means for representing a product with at least one product structure; means for mapping a domain relationship from said at least one product structure; and means for deriving a fulfilled product structure through said mapping.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 1:
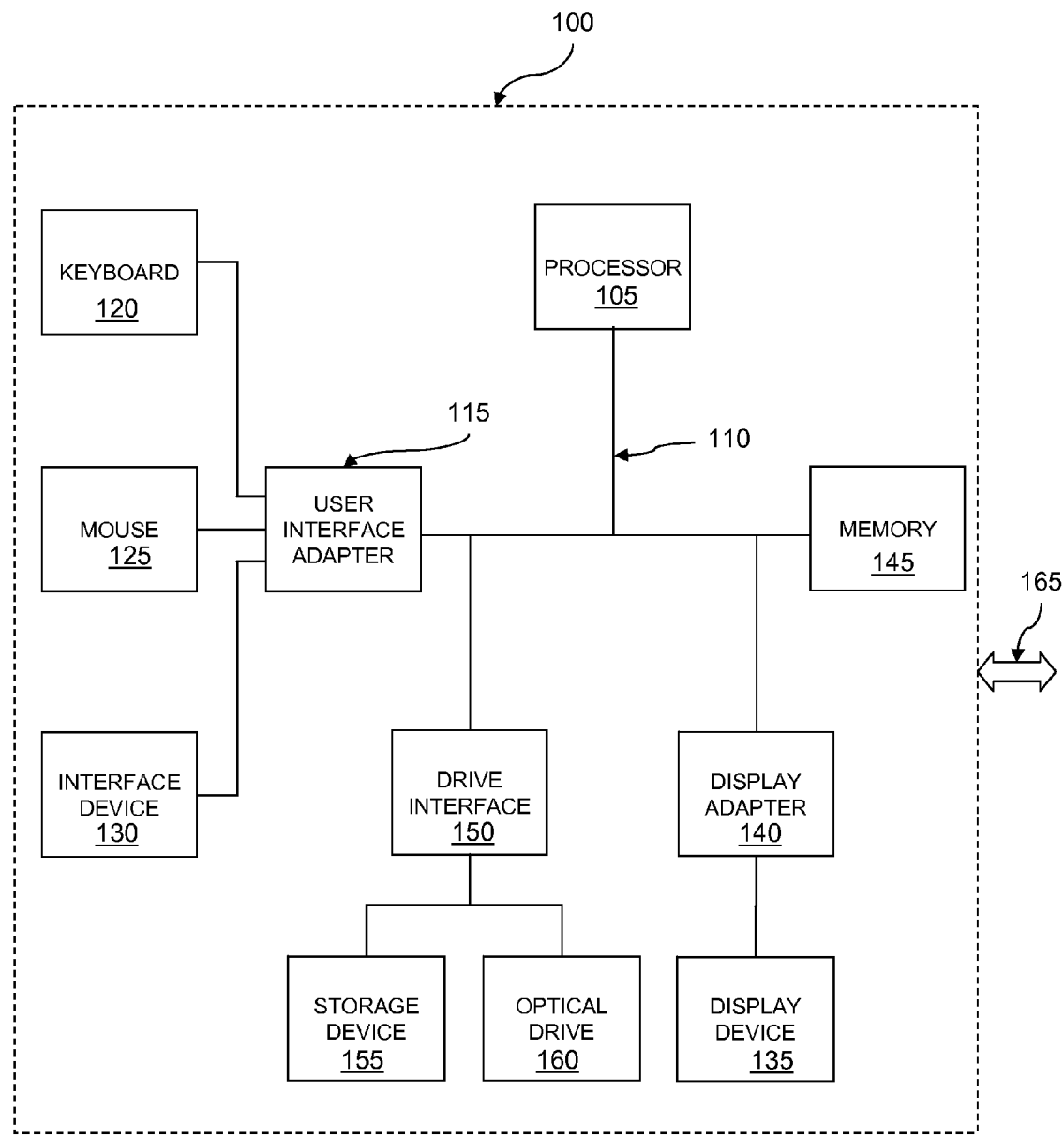
FIG. 1 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method of allocating multiple product structures. Now therefore, in accordance with the presently preferred embodiment, an operating system executes on a computer, such as a general-purpose personal computer. FIG. 1 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

With reference to FIG. 1, an exemplary system for implementing the presently preferred embodiment includes a general-purpose computing device in the form of a computer 100, such as a desktop or laptop computer, including a plurality of related peripheral devices (not depicted). The computer 100 includes a microprocessor 105 and a bus 110 employed to connect and enable communication between the microprocessor 105 and a plurality of components of the computer 100 in accordance with known techniques. The bus 110 may be any of several types of bus structures including a memory bus or memory controller, a peripheral bus, and a local bus using any of a variety of bus architectures. The computer 100 typically includes a user interface adapter 115, which connects the microprocessor 105 via the bus 110 to one or more interface devices, such as a keyboard 120, mouse 125, and/or other interface devices 130, which can be any user interface device, such as a touch sensitive screen, digitized pen entry pad, etc. The bus 110 also connects a display device 135, such as an LCD screen or monitor, to the microprocessor 105 via a display adapter 140. The bus 110 also connects the microprocessor 105 to a memory 145, which can include ROM, RAM, etc.

The computer 100 further includes a drive interface 150 that couples at least one storage device 155 and/or at least one optical drive 160 to the bus. The storage device 155 can include a hard disk drive, not shown, for reading and writing to a disk, a magnetic disk drive, not shown, for reading from or writing to a removable magnetic disk drive. Likewise the optical drive 160 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 100.

The computer 100 can communicate via a communications channel 165 with other computers or networks of computers. The computer 100 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 145 of the computer 100. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System

Figure 2:
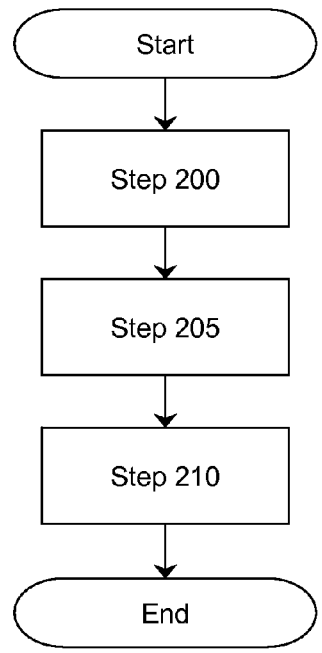
FIG. 2 is a flowchart of the major components for a system and method for allocating multiple product structures.

FIG. 2 is a flowchart of the major components for a system and method for allocating multiple product structures. Referring to FIG. 2, the system represents a product that has at least one product structure (Step 200). Next the system maps a domain relationship from the at least one product structures (Step 205). Then the system derives a fulfilled product structure from the mapped domain relationship (Step 210).

Figure 3:
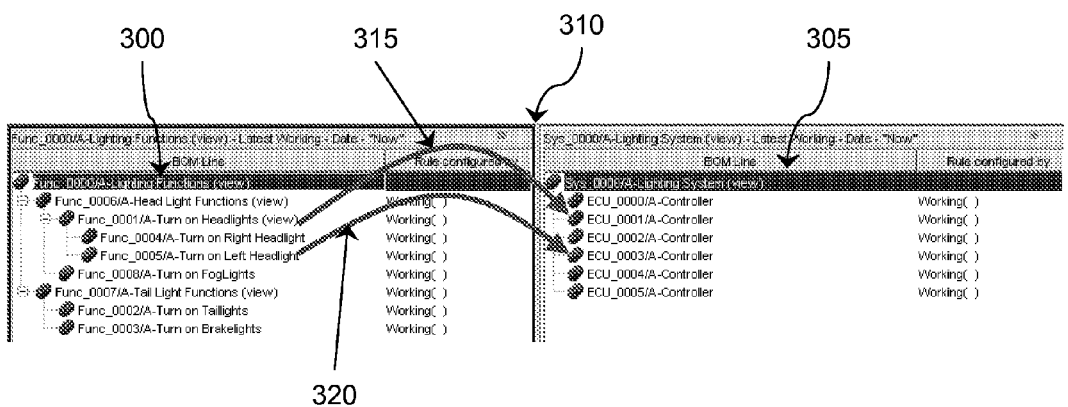
FIG. 3 is an illustration of an allocation between two product structures.

FIG. 3 is an illustration of an allocation between two product structures. A first product structure representing a functional model 300 and a second product structure representing a design model 305, where the functional model 300 represents the functionalities of the product, for example, the functional model of a may car represent functionalities like an air conditioning system, power braking, and power steering. Likewise, the design model 305 represents the physical design of the product, for example, an engine controller unit implemented in an ASIC. Referring to FIG. 3, a user displays the functional model 300 and the design model 305 in a BOM (bill of material) view 310 and allocates, by use of any commonly used selecting mechanisms, e.g., click and highlight, or drag and drop, the function for turning on Headlights (view) to be performed by a ECU_0001/A-Controller 315, and the function for turning on the left headlight to be performed by a ECU_0003/A-Controller 320, both in a one-to-one allocation.

Figure 4:
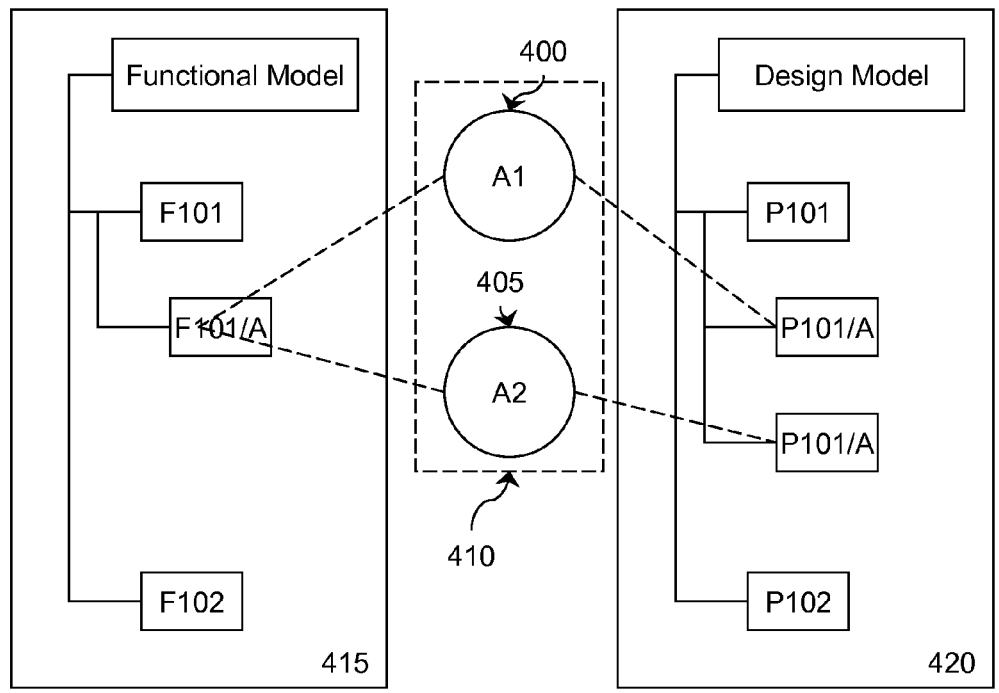
FIG. 4 is an illustration of a conditional allocation relationship.

Allocations among the product structures are also configurable based upon rules in the product structure, based on what the components point to/from, or based on user-definable criteria regarding the product. FIG. 4 is an illustration of a conditional allocation relationship. By attaching conditions on relationships, the user can configure various allocations in and out of a product. Referring to FIG. 4, a condition on A1 400 is "If Model=Sport and Color=Green, then Type=Coupe." On a second allocation A2 405, "If Model=Sport and Color=Blue, then Type=Sedan." For a conditional allocation example, if the functional component has criteria X, then the design component should be Y in the design model otherwise, the design object should be Z in the design model. The conditions are flexible enough so that a relationship can be defined such that it would not point to anything should a certain set of criteria be true or not true, allowing the allocation to be configured out. Multiple allocation sets between product structures can co-exist and the context for each allocation set can be represented by an Allocation Context 410. For example, in the allocation A1 400, the context could be mapped for cost optimization. In a similar example, for the allocation A2 405, the context could be mapped for performance optimization. In the presently preferred embodiment, allocations are created through an application programming interface (API) as a special type of relationship between absolute occurrences of specific components in a functional model 415 to one or more absolute occurrences of the corresponding components in a physical model or design model 420. The allocation is related to the absolute occurrence of the component so that it is revision independent of the source component. Specifying the relationship in this manner enables the system to allow for allocations to change from revision to revision of the functional model 615, while maintaining relationships between absolute occurrences in various revisions of the design model 620. Product structures are represented as configurable hierarchical occurrences between components. The absolute occurrence represents an individual component in a product structure independently from its location in the over all product to provide a mechanism to relocate the component anywhere in the hierarchy and retain its relationships.

Figure 5:
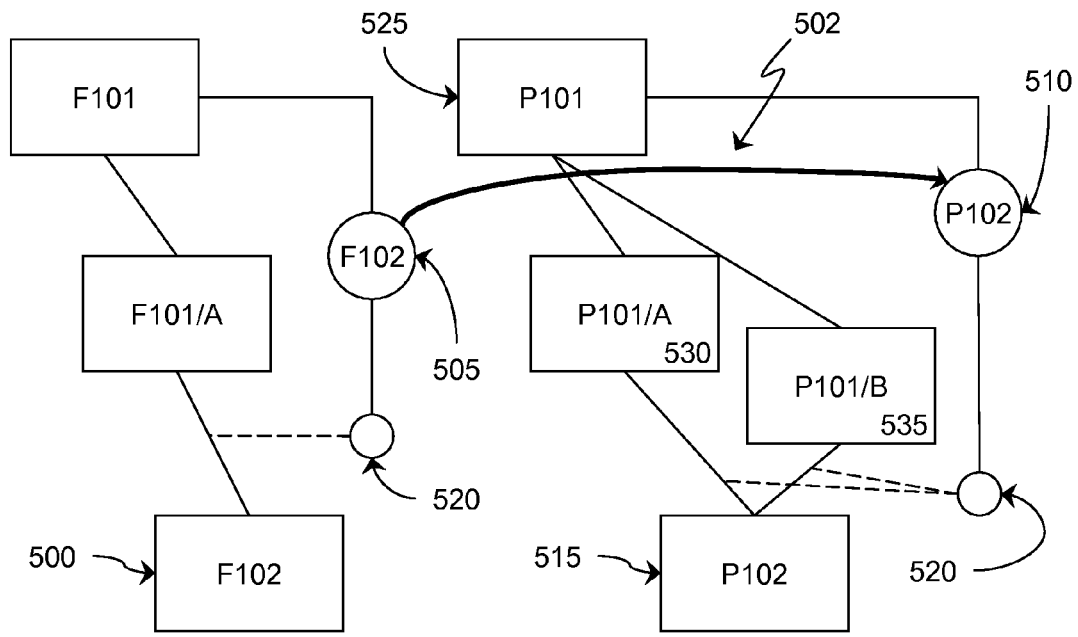
FIG. 5 is an illustration an allocation between functional and design models.

FIG. 5 is an illustration an allocation between functional and design models. Referring to FIG. 5, for Function F102 500 the user allocates, generally shown at 502, an absolute occurrence F102 505 to an absolute occurrence of Part P102 510 for a Part P102 515 in the design model 420, having an absolute occurrence 520 thread to map the absolute occurrence relationships. If a part P101 525 is revised from a part P101/A 530 to a part P101/B 535, the allocation can be changed to another point without disrupting the allocation on the part P101/A 530. Allocations are created between the absolute occurrence 520 of the object in the functional model 415 and the absolute occurrence 520 of a part in the design model 420. When the functional model 415 is revised the allocation remains intact, and the user changes the allocation through incremental change or by creating a new allocation with an appropriate effectivity and correlating effectivity with that of the functional component.

Figure 6:
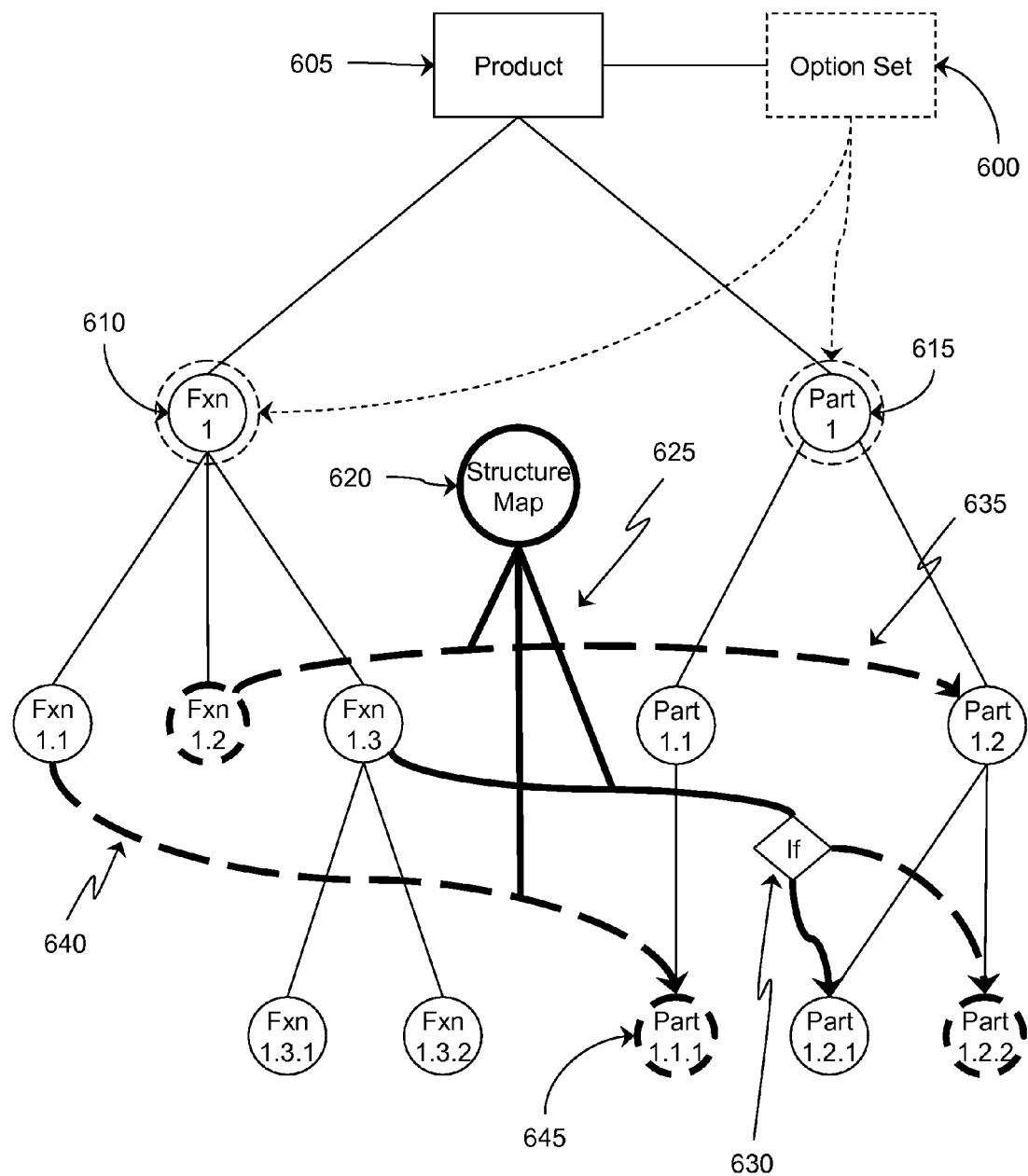
FIG. 6 is a diagram illustrating conditional allocations.

FIG. 6 is a diagram illustrating conditional allocations. Referring to FIG. 6, an option set 600 is assigned to a product 605. The option set could be shared with a function structure 610 and a physical structure 615, but does not have to be. A structure map 620 has a list of allocations, generally indicated at 625, that are valid for the function structure 610. These allocations 625 can have conditions on them that use the option set 600 or that evaluate other information in the function structure 610. Values are set in the configuration that can then be used to determine which allocations are configured in, e.g., Function 1.3 is implemented by Part 1.2.1 if <condition>, otherwise by variant Part 1.2.2, generally illustrated at 630. Another allocation example is, Part 1.2 provides the realization of Function 1.2, generally illustrated at 635. These allocations can then be used to determine which physical components are required to fulfill those allocations. The basic rule is, if the source component is configured out, then there is no need to worry about the allocation, generally shown at 640. From the list of allocations configured in, a set of physical components are determined. Put another way, when using conditional allocations, a parts list is not related to a particular product structure, but is in stead simply a list of parts. When the target parts are part of a product structure, the system can determine exactly which instances of a component will fulfill the specified functionality.

In the case of conditional relationships, a group of allocations are defined with an option set that is relevant for the modeled product. Various conditions are defined using the option set 600, e.g., to describe a car model, then the variant conditions could require a particular condition. Because the targets of these relations are part of the physical structure 615, configuration rules can be applied to that structure. If an allocation is unfulfilled 640, one of two responses are prompted. The first is to report an error stating that a target structure 645 is not configured properly because there are unfulfilled allocations. The second is to add the allocated components to the configuration, essentially overriding the structure rules. Adding these components can be done by evaluating the allocations 640, getting a list of allocated components, and then applying a new configuration rule to the target structure 645 stating that components in the list are always configured in.

Figure 7:
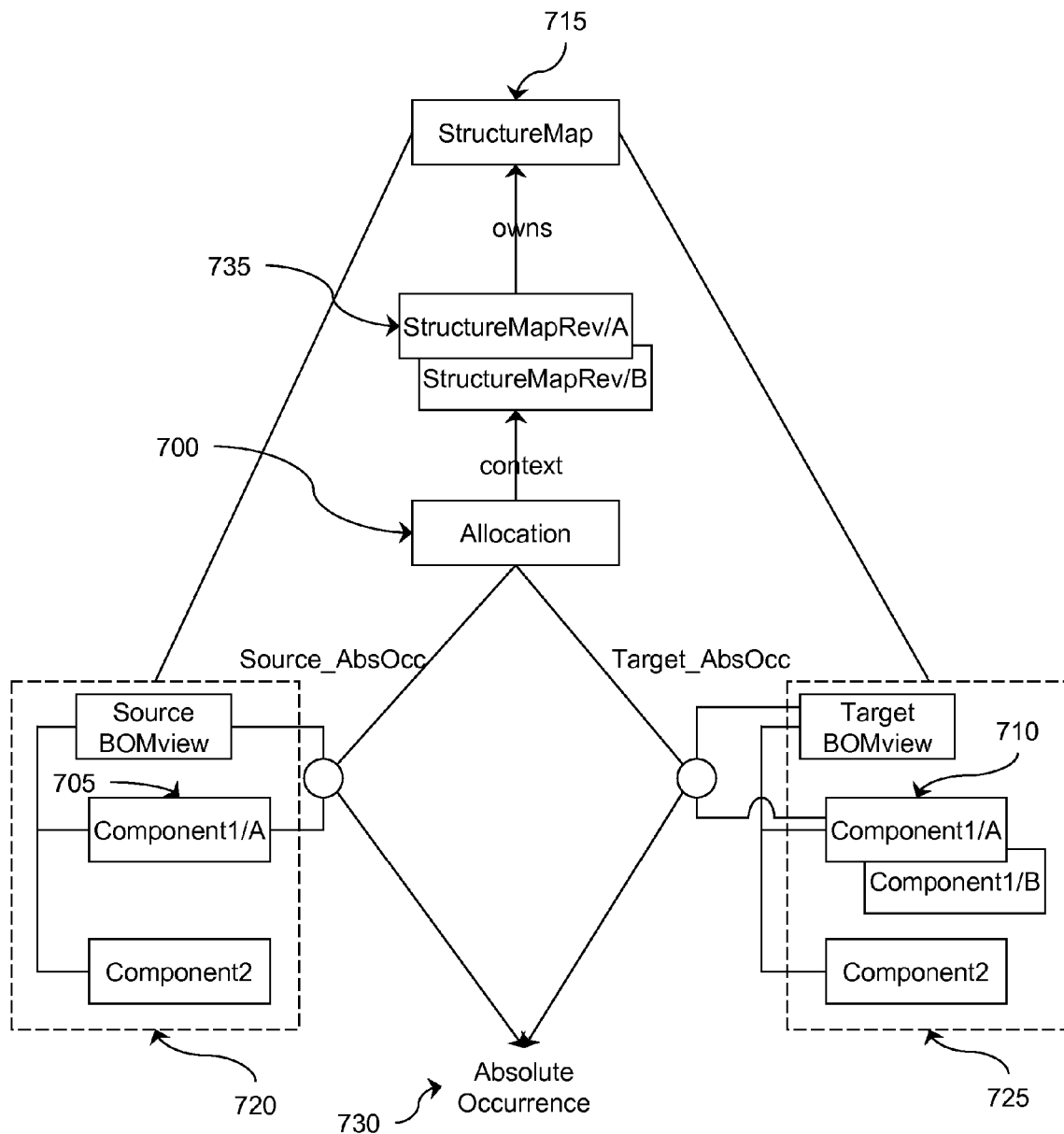
FIG. 7 is an illustration of components and views for allocating multiple product structures.

FIG. 7 is an illustration of components and views for allocating multiple product structures. Allocations connect, or tie, together a source with a target, e.g., a source BOM with a target BOM. Referring to FIG. 7, an allocation object 700 ties a source component 705 with a target component 710, and a StructureMap object 715 ties a source BOMview 720 of a source product structure, e.g., the functional model 415, together with a target BOMview 725 of a target product structure, e.g., the design model 420. As the product evolves, the components are revised upwards, however, the allocation object 700 is not tied to a specific revision of the components, so an absolute occurrence object 730 makes allocations independent of the revisions of the underlying object. The StructureMap object 715 refers to two structures of arbitrary types giving the necessary context for the allocation. The allocations are then defined in the context provided by the StructureMap object 715, where that object points to the two product structures, e.g., the source view 720 and the target view 725, by using a PSBOMview object where the PSBOMview object is a bill of material view for the product structure. As the product structure evolves with various revisions, the existing allocations change to reflect those revisions and a StructureMapRev object 735 provides the context to the allocation object 700 such that the StructureMapRev object 735 is revisable by the user, e.g., from the StructureMapRev/A to the StructureMapRev/B. An ImanType object defines domain relationships of the allocation object 700 and the StructureMap object 715 to logically tie product views together. Domain relationships include "fulfillment" or "implemented by" or "realization of" that are used to build-out allocation assignments, e.g., parts 1 and 2 provide the fulfillment of the system component Sys1; or functions 1 and 2 are implemented by system component Sys1; or part 1 provides the realization of functions 1, 2, and 3. These domain relationships can optionally be filtered for various uses, e.g., minimizing cost, allowing multiple simultaneous domain mappings for various purposes.

Figure 8:
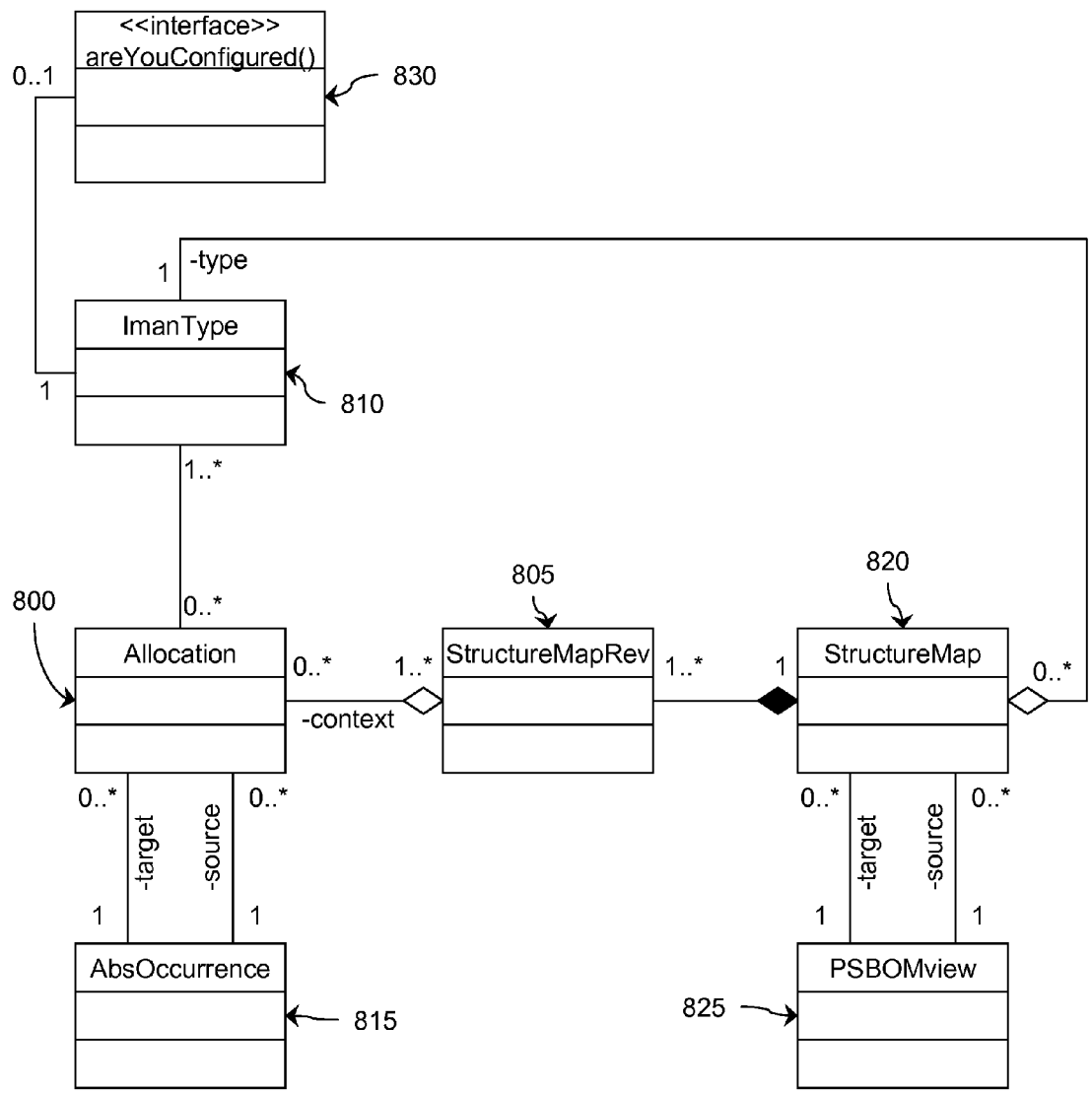
FIG. 8 is an illustration of a UML class diagram for allocating multiple product structures.

Turning now to an implementation object model, FIG. 8 is an illustration of a UML class diagram for allocating multiple product structures. Referring to FIG. 8, an Allocation class 800 shares the source product structure and the target product structure with a StructureMapRev class 805, an ImanType class 810, and an AbsOccurrence class 815. A StructureMap class 820 associates to a BOM view of a source structure and a target structure from a PSBOMview class 825, and owns by composition association the StructureMapRev class 805. The StructureMap class 820 also shares the source product structure and the target product structure with the ImanType class 810 and the PSBOMview class 825. The StructureMapRev class 805 is shared by the Allocation class 800 and the StructureMap class 820. The Allocation class 800 is given an Iman Method place holder to implement specific domain relationship behavior. Every time the user wants to discover whether the Allocation class 800 is configured in or not, a registered method, e.g., areYouConfigured( ) 830, is invoked on the Allocation class 800, and the answer is returned to the ImanType class 510 whether to configure.

CONCLUSION

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment, such as configuring the source BOM view and the target BOM view independently from each other, and to then allocate them both and see what components are left unallocated. Further only the source BOM view can be configured, along with a series of allocations to then define the target structure. It is also understood that product structures could be a system structure, an electrical structure, manufacturing operations applicable to a product and/or its product structures, or simulation models applicable to a product and/ or its structures, for example. Therefore, other implementations are within the scope of the following claims.

What is claimed is:

1. A computer implemented method for allocating product structures, comprising:
    representing a product with more than one product structure;
    mapping a domain relationship from said more than one product structure; and
    deriving, using a processor, a fulfilled product structure through said mapping.

2. The method of claim 1, wherein said domain relationship is a fulfillment from a first product structure to at least one more product structure.

3. The method of claim 1, wherein said domain relationship is a first product structure implemented by at least one other product structure.

4. The method of claim 1, wherein said domain relationship is a first product structure that provides the realization of at least one other product structure.

5. The method of claim 1, wherein said domain relationship is conditional based upon a defined rule set.

6. The method of claim 1, wherein a revision history is maintained for said mapping step.

7. The method of claim 1, wherein said product structure is one of a functional model, a physical model, and a logical model.

8. A computer implemented method for allocating product structures, comprising:
    representing a product with more than one product structure;
    mapping a domain relationship from said more than one product structure, wherein said domain relationship is one of a fulfillment, an implemented-by, and a realization of; and
    deriving, using a processor, a fulfilled product structure through said mapping.

9. A computer-program product tangibly embodied in a non-transitory machine readable medium to perform a method, comprising:
    instructions for representing a product with more than one product structure;
    instructions for mapping a domain relationship from said more than one product structure; and
    instructions for deriving a fulfilled product structure through said mapping.

10. The computer-program product of claim 9, wherein said domain relationship is a fulfillment from a first product structure to at least one more product structure.

11. The computer-program product of claim 9, wherein said domain relationship is a first product structure implemented by at least one other product structure.

12. The computer-program product of claim 9, wherein said domain relationship is a first product structure that provides the realization of at least one other product structure.

13. The computer-program product of claim 9, wherein said domain relationship is conditional based upon a defined rule set.

14. The computer-program product of claim 9, wherein a revision history is maintained for said mapping step.

15. The computer-program product of claim 9, wherein said product structure is one of a functional model, a physical model, and a logical model.

16. A computer-program product tangibly embodied in a non-transitory machine readable medium to perform a method, comprising:

instructions for representing a product with more than one product structure;
instructions for mapping a domain relationship from said more than one product structure,
wherein said domain relationship is one of a fulfillment, an implemented-by, and a realization of; and
instructions for deriving a fulfilled product structure through said mapping.

17. A data processing system comprising a processor and accessible memory to implement a method for allocating product structures, the data processing system particularly configured to perform the steps of:
representing a product with more than one product structure;
mapping a domain relationship from said more than one product structure; and
deriving a fulfilled product structure through said mapping.

* * * * *